J. LANG.
SPRING WHEEL.
APPLICATION FILED APR. 3, 1922.

1,432,604. Patented Oct. 17, 1922.

John Lang.
INVENTOR

BY Victor J. Evans
ATTORNEY

WITNESS:

Patented Oct. 17, 1922.

1,432,604

UNITED STATES PATENT OFFICE.

JOHN LANG, OF PHILADELPHIA, PENNSYLVANIA.

SPRING WHEEL.

Application filed April 3, 1922. Serial No. 549,290.

*To all whom it may concern:*

Be it known that I, JOHN LANG, a citizen of Rumania, residing at Philadelphia, in the county of Philadelphia and State of Pennsylvania, have invented new and useful Improvements in Spring Wheels, of which the following is a specification.

My invention has relation to a spring vehicle wheel wherein the solid tire is used, the wheel being of the pressed metal type consisting of a clincher or rim for the solid tire, the rim also carrying separable housing members for the yielding means such as coiled springs, a central disc member provided with a hub for the axle, the outer peripheral portion of said disc member extending into said housing, said peripheral portion connected to and yieldingly supported between the outer and inner peripheral walls of said housing by the springs contained therein to provide a floating or yielding connection between the disc and the said housing and solid tire.

A further object of my invention is to provide a vehicle wheel of this character consisting of pressed metal parts which are durable for service and the co-relation of the various elements, and the supporting means for the springs between the central disc and the housing making the wheel practical for all the purposes intended.

With the foregoing and other objects in view as will be more apparent as this description proceeds, my invention consists essentially in the novel features of construction, combination and arrangement of parts hereinafter more fully described and more specifically defined by the appended claims.

In the further disclosure of the invention reference is to be had to the accompanying sheet of drawings constituting a part of this specification and in which like characters of reference designates the same or corresponding parts in all the views.

Figure 1:
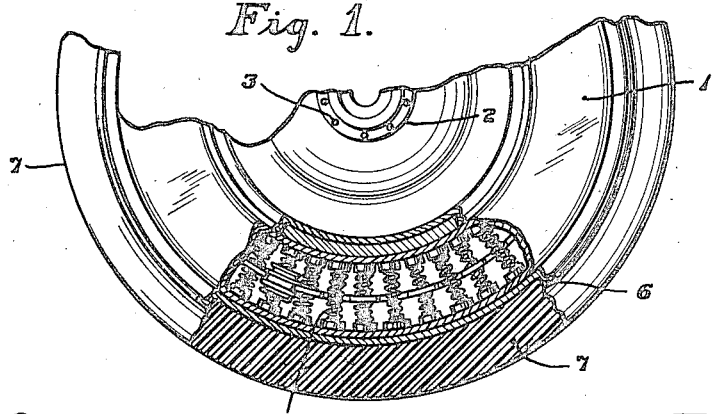
Figure 1 is a fragmentary elevational view partly in section a novel embodiment of my vehicle wheel.
Figure 2:
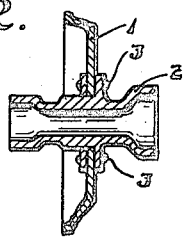
Figure 2 is a fragmentary vertical section of the central disc in connection with the hub of the wheel.
Figure 3:
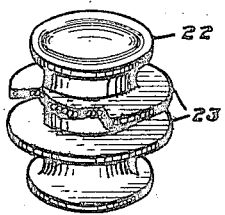
Figure 3 is a perspective view of one of the guide members for the springs.
Figure 4:
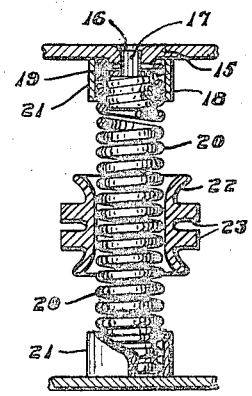
Figure 4 is a sectional view partly in elevation showing the mounting for one of the radial springs.
Figure 5:
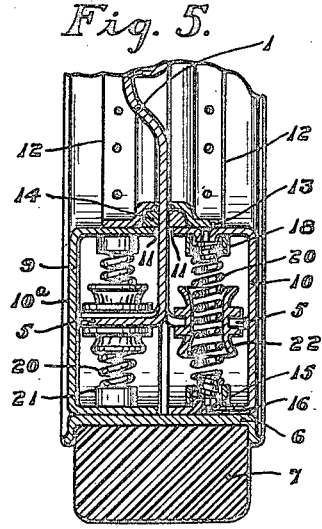
Figure 5 is a fragmentary transverse sectional view taken on the line 5—5 of Figure 1 showing the manner of enclosing the springs in the housing portion of the rim.
Figure 6:
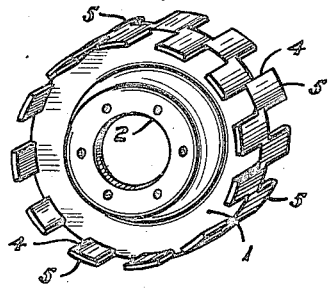
Figure 6 is a perspective view of the central disk of the wheel showing the same reduced in scale; and, Figure 7 is a perspective view of one of the spring members to hold the ends of the spring in respect to the housing.
Figure 7:
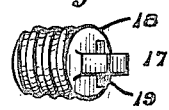

According to my invention my novel spring vehicle wheel is of the pressed metal type and consists of the central disc member 1 provided with the auxiliary arranged hub 2 secured to said disc 1 either by welding or by the rivets 3. The central disc member 1 is recessed about the periphery portion as at 4 to form the tongues 5 which are bent alternately in opposite directions at right angles to the disc 1. The functions of which will be more fully hereinafter referred to. 6 designates the rim or clincher portion of the wheel in which is carried the solid rubber tire 7, the object of the invention being to provide a resilient or spring yielding action between the solid tire and the axle of the wheel to prevent jarring of the vehicle.

To the rim or clincher of the wheel is secured by any desirable means the annular housing members 9 and 10 spaced apart transversely at 11 to allow for the admission therebetween of the disc member 1, said members 9 and 10 forming the housing 10$^a$ for the yielding springs of the wheel. The annular housing members 9 have secured thereto the annular plates 12 which are angular as at 13 in transverse section to receive a packing material 14 to seal the interior of the housing member against any foreign matters such as dust and the like.

The outer and inner peripheral walls of the annular housing members 9 and 10 are pressed inwardly as at 15 to form the radial opening 16 in respect to the axis of said annular members. In these openings 16 is positioned a pin 17 integral with an externally threaded member 18, the pin and threaded member being secured in position in respect to the pressed out portion by the cotter pin 19. 20 designates a series of radially extending coiled springs carried in the housings, these springs provide the means for effecting the yielding or resilient action between the solid tire and the axle of the wheel. The springs are held radial by threaded ends thereof onto the threaded member 18 carried by the inner and outer peripheral walls of the housing. To further hold the ends of the spring to the threaded members 18 I provide the sleeves 21 which may be attached or welded to the housing walls.

To yieldingly hold the disc member mounted on the axle of the vehicle in respect to the housing 10ª I provide the sleeves 22 formed with the spaced flanges 23, the sleeve portion thereof being positioned in the recess 4 and in the tongues 5 of the disc engaging between the spaced flanges 23 to hold the said sleeves in respect to the disc 1. The coiled springs 20 pass through and are secured to said sleeves in any desirable manner to form a yielding connection between the sleeves carried on the disc and outer and inner peripheral walls of the housing to which the ends of the springs are secured.

It will readily be seen that with a construction of this character the disc 1 is yieldingly supported in relation to the housing 10ª or vice versa.

Having described my invention, what I claim as new and desire to secure by Letters Patent is:

1. A spring wheel comprising a tire carrying rim, a transversely separable annular housing carried on said rim, a series of radially disposed coiled springs in said housing, a central disc provided with an axle hub, the outer peripheral portion of said disc being positioned in said housing and having vertical movement with respect to said housing, and means for connecting said disc to the aforesaid radial springs to yieldingly support the disc with respect to said housing and the tire.

2. In a spring wheel of the character described and including a tire carrying rim, a transversely separable housing and a central disc provided with an axle hub, the combination of a series of radially disposed springs mounted within the aforesaid annular housing, and means connecting the outer peripheral edge of the central disc to the spring whereby the aforesaid central disc is yieldingly supported with respect to the wheel tire.

3. In a spring wheel of the character described and including a tire carrying rim, a transversely separable housing and a central disc provided with an axle hub, the combination of a series of radially disposed springs mounted within the aforesaid annular housing, and lateral ears on the peripheral edge of the aforesaid central disc having separable connection with sleeves yieldingly supported by the aforesaid springs.

4. In a spring wheel of the character described and including a tire carrying rim, a transversely separable housing and a central disc provided with an axle hub, the combination of a series of radially disposed springs mounted within the aforesaid annular housing, and lateral ears on the peripheral edge of the aforesaid central disc having separable connection with sleeves yieldingly supported by the aforesaid springs, the aforesaid springs being connected at their free ends by threaded plugs to the radial walls of the annular housing.

5. In a spring wheel of the character described and including a tire carrying rim, a transversely separable housing and a central disc provided with an axle hub, the combination of a series of radially disposed springs mounted within the aforesaid annular housing, lateral ears on the peripheral edge of the aforesaid central disc having separable connection with sleeves yieldingly supported by the aforesaid springs, the aforesaid springs being connected at their free ends by threaded plugs to the radial walls of the annular housing, and the aforesaid sleeves having radial flanges intermediate their ends, said flanges being adapted to mesh with the alternate lateral ears on the peripheral edge of the central disc.

In testimony whereof I affix my signature.

JOHN LANG.